US011258878B2

(12) United States Patent
Lee et al.

(10) Patent No.: US 11,258,878 B2
(45) Date of Patent: Feb. 22, 2022

(54) METHOD FOR PROVIDING QOS DIFFERENTIATION IN A MULTI-TENANT NETWORK AND NETWORKING DEVICE EMPLOYING METHOD

(71) Applicants: CyberTAN Technology, Inc., Hsinchu (TW); National Chung Cheng University, Taiwan (TW)

(72) Inventors: Shi-Wei Lee, Chiayi (TW); Chun-Yi Chen, Chiayi (TW); Chung-Ho Wu, Hsinchu (TW); Wei-Ning Chang, Hsinchu (TW); Poyu Liu, Hsinchu (TW)

(73) Assignees: CyberTAN Technology, Inc., Hsinchu (TW); National Chung Cheng University, Chiayi (TW)

( * ) Notice: Subject to any disclaimer, the term of this patent is extended or adjusted under 35 U.S.C. 154(b) by 225 days.

(21) Appl. No.: 16/558,610

(22) Filed: Sep. 3, 2019

(65) Prior Publication Data

US 2021/0067604 A1 Mar. 4, 2021

(51) Int. Cl.
*H04L 29/08* (2006.01)
*H04L 12/873* (2013.01)
*H04L 67/61* (2022.01)
*H04L 47/52* (2022.01)
*H04L 67/63* (2022.01)

(52) U.S. Cl.
CPC .......... *H04L 67/322* (2013.01); *H04L 47/527* (2013.01); *H04L 67/327* (2013.01)

(58) Field of Classification Search
CPC .... H04L 47/527; H04L 67/322; H04L 67/327
See application file for complete search history.

(56) References Cited

U.S. PATENT DOCUMENTS

| 9,350,674 B2 | 5/2016 | Figueira | |
|---|---|---|---|
| 2011/0096666 A1* | 4/2011 | Davari | H04L 47/215 370/235 |
| 2020/0127932 A1* | 4/2020 | Srivastava | H04L 47/527 |

OTHER PUBLICATIONS

Lee et al., "A Traffic Meter Based on a Multicolor Marker for Bandwidth Guarantee and Priority Differentiation in SDN Virtual Networks," in IEEE Transactions on Network and Service Management, vol. 16, No. 3, pp. 1046-1058, Sep. 2019, doi: 10.1109/TNSM.2019.2923110 (Date of Publication:Jun. 14, 2019) (Year: 2019).*

"A Two Rate Three Color Marker," Network Working Group Request for Comments: 2698, RFC 2698, Sep. 1999 (retrieved from: https://datatracker.ietf.org/doc/html/rfc2698) (Year: 1999).*

* cited by examiner

*Primary Examiner* — Brian P Cox
(74) *Attorney, Agent, or Firm* — ScienBiziP, P.C.

(57) ABSTRACT

A method for providing a differentiation in terms of quality of service (QoS) for multiple tenants in a network, by a networking device receives a data packet from a transmitting tenant, and the networking device identifies the tenant and a priority class of the received packet. The networking device then determines one or more color markers to apply to the received packet according to the sending tenant and the priority to be associated with the packet. The networking device then transmits or does not transmit the packet onwards depending on one or more color markers applied to the packet.

16 Claims, 4 Drawing Sheets

METHOD FOR PROVIDING QOS DIFFERENTIATION IN A MULTI-TENANT NETWORK AND NETWORKING DEVICE EMPLOYING METHOD

FIELD

The subject matter herein generally relates to networking.

BACKGROUND

Network virtualization is a technology that enables multiple tenants to share a common physical network. A tenant needs to have dedicated bandwidth and a priority differentiation capability to provide quality of service (QoS) for its service flows. However, current multi-tenant bandwidth guarantee cannot provide priority guarantee for QoS differentiation for each tenant at the same time.

Thus, there is room for improvement within the art.

BRIEF DESCRIPTION OF THE DRAWINGS

Implementations of the present technology will now be described, by way of embodiment, with reference to the attached figures, wherein.

DETAILED DESCRIPTION

Figure 1:
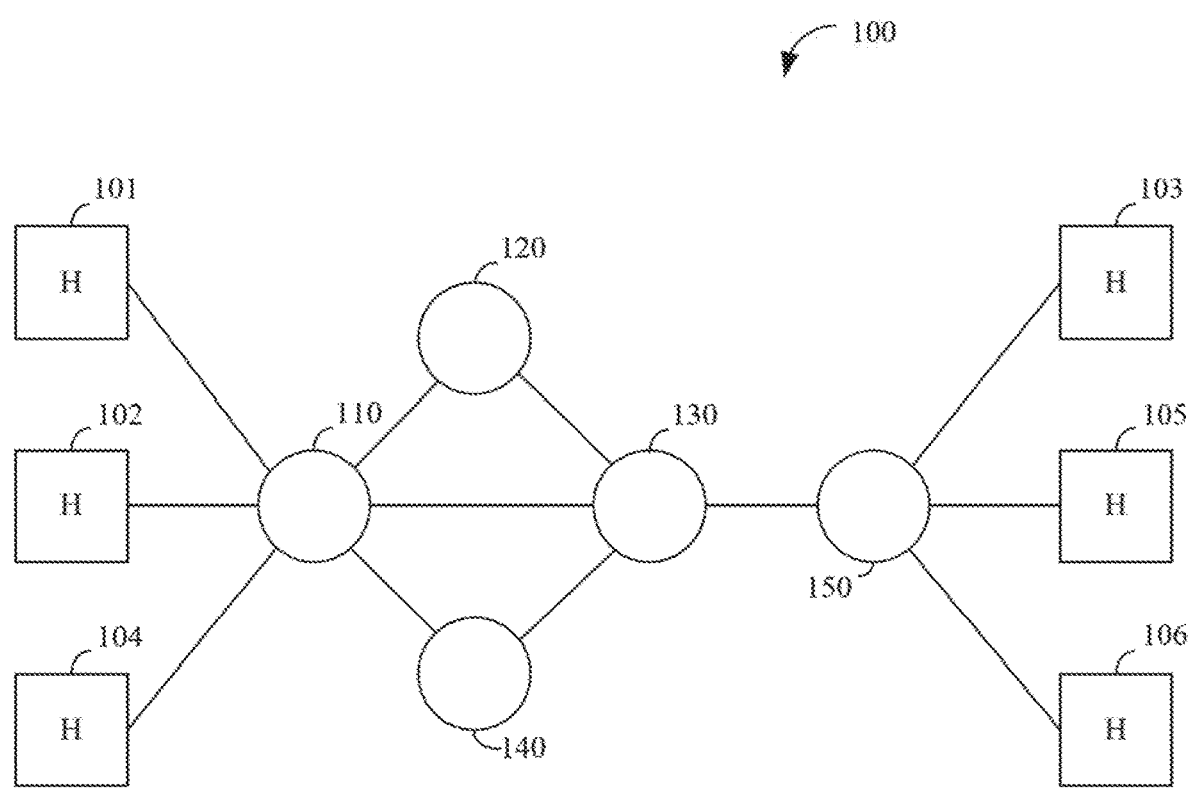
FIG. 1 is a schematic diagram of one embodiment of a multi-tenant network.

It will be appreciated that for simplicity and clarity of illustration, where appropriate, reference numerals have been repeated among the different figures to indicate corresponding or analogous elements. In addition, numerous specific details are set forth in order to provide a thorough understanding of d the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an example of a multi-tenant network 100 according to an embodiment. For example, there may be three virtual networks, corresponding to three distinct tenants. Tenant 'A' having two hosts 101 and 103, tenant 'B' having two hosts 102 and 105, and tenant 'C' having two hosts 104 and 106. The number of tenants and their associated hosts are merely representative. The hosts 101-106 are connected using a plurality of communication links and networking devices 110-150. In one embodiment, each networking device 110-150 is a physical device, and each communication link is a physical communication link. In another embodiment, one or more of the networking devices 110-150 and/or one of more of the communication links can be virtualized (e.g. virtual network devices and virtual communication links). Each communication link has a certain bandwidth capacity, for example, 1 gigabit per second (Gbps). Each tenant serviced by the multi-tenant network 100 may have subscribed to networking services with a QoS defined. For example, each tenant's guaranteed bandwidth is dedicated to the tenant, and the bandwidth is not influenced by the traffic generated by other tenants in the multi-tenant network 100. In addition, the high-priority traffic of each tenant can be processed at needed bandwidth unless the total amount of high-priority traffic exceeds the tenant's guaranteed bandwidth.

Figure 2:
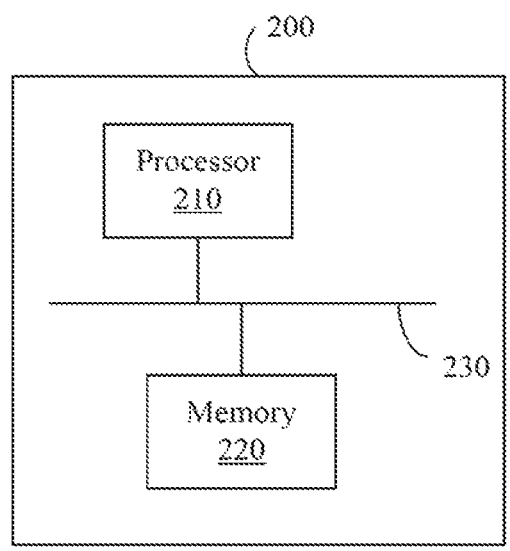
FIG. 2 is a block diagram of one embodiment of a networking device of the multi-tenant network of FIG. 1.

FIG. 2 illustrates a block diagram of a networking device 200 that may be used within the multi-tenant network 100 of FIG. 1. For example, the networking device 200 may correspond to the networking devices 110-150. The networking device 200 comprises a processor 210 and a memory 220. The processor 210 and the memory 220 communicate through a bus 230. The processor 210 may be a general-purpose central processing unit, a microcontroller, an application-specific integrated circuit (ASIC), or one or more integrated circuits, to execute a related program. The memory 220 may be read-only memory (ROM), a static storage device, a dynamic storage device, or a random access memory (RAM). The memory 220 may store one or more computer programs for operating the networking device 200, the programs being executed by the processor 210.

In this embodiment, the bandwidth usage of each port of the networking device 200 is controlled by using a plurality of multicolor marker meters. In order to provide independent QoS differentiation for each tenant, in one embodiment, the networking device 200 can configure N multicolor marker meters for N tenants respectively. For each tenant, there is a corresponding multicolor marker meter. Each multicolor marker meter is responsible only for metering the packets belonging to its tenant. Each multicolor marker meter comprises a plurality of color markers. The number of color markers in one marker meter is the same as the number of priority classes of their corresponding tenant. For example, a tenant 'A" that has k priority classes is associated with a multicolor marker meter comprising k color markers. In one embodiment, the plurality of color markers comprise any marker that can provide two colors to indicate if a flow is confined within its committed rate, such as a single-rate three-color marker (srTCM), and a two-rate three-color marker (trTCM). All the color markers in a multicolor marker meter of a tenant are set to have the same token adding rate. For example, for a tenant with a guaranteed bandwidth of r megabits per second (Mbps), the token adding rate of each color marker inside its corresponding multicolor marker meter is set to r Mbps. In one embodiment, for each tenant, the networking device 200 configures the peak information rate (PIR) as the guaranteed bandwidth and the committed information rate (CIR) as zero for all the color markers of the marker meter. As a result, taking srTCM marker for example, the color marker will assign red to the packets that violate the rate limitation of PIR, otherwise the packets are colored yellow. In one embodiment, a packet colored yellow can also be considered to be green.

Figure 3:
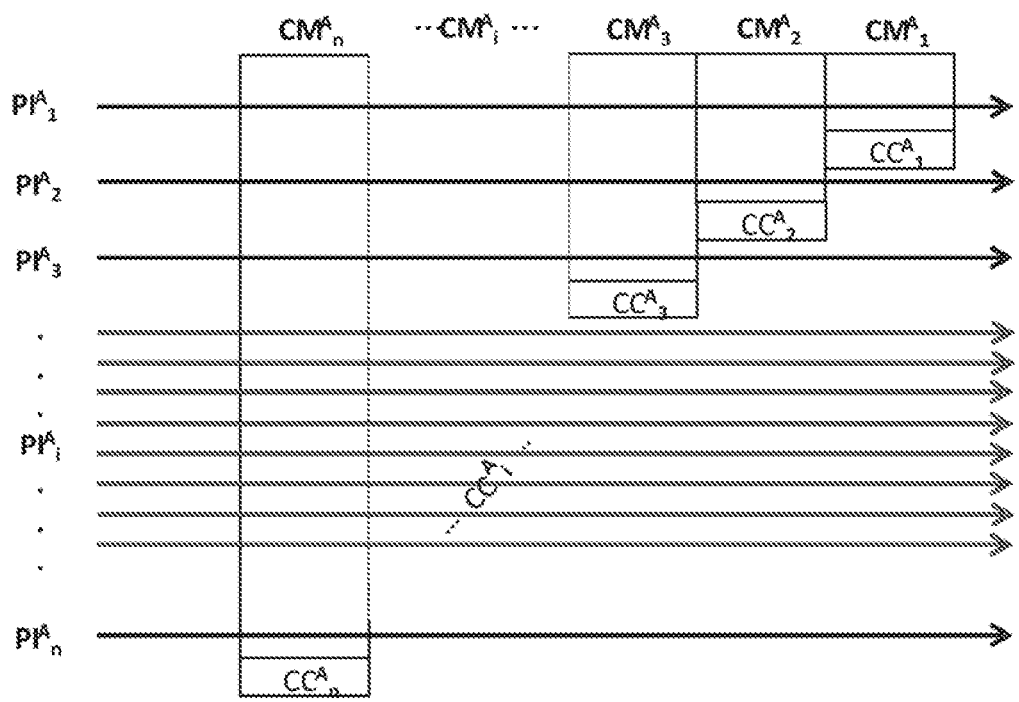
FIG. 3 is a schematic diagram of one multi-color marker meter for a single tenant.

FIG. 3 illustrates a schematic diagram of one multi-color marker meter for a single tenant, taking tenant 'A' for example. The number of color markers for the tenant 'A' is same as the number of priority classes for the tenant 'A'. In FIG. 3, there are a total n priority classes for the tenant 'A'. In FIG. 3, $PI^A_i$ denotes the packet identified as the ith priority class for the tenant 'A', for i=1 to n. $CM^A_i$ denotes the color marker associated with the ith priority class for the tenant 'A', for i=1 to n. $CC^A_i$ denotes a compensation credit for the number of tokens in the $CM^A_i$ stored (hereinafter "bucket"). The compensation credit for each color marker is initially set to zero, that is, $CC^A_i$ is initially set to zero. In this example, the color markers are arranged in ascending order such that priority 1 is the highest priority and priority n is the lowest priority. In another example, the color marker can be arranged in descending order. The received packet of the tenant 'A' is classified based on the priority. The packet with the highest priority, priority 1, is given a color by all of the color markers in the multi-color marker meter. The packet with priority 2 is given a color by all of the color markers except the $CM^A_1$. The packet with the lowest priority, priority n, is given a color only by the $CM^A_n$. For a packet classified as priority i, the coloring associated with priority i is a primary color marker, and other color markers may be subsidiary color markers in a prioritized order. That is, tokens of the color marker associated with priority i are shared by packets with a priority larger than or equal to i. In one embodiment, if the number of tokens cannot be updated, a compensation credit is coupled to a color marker to correct the number of tokens of the color marker. For example, a negative value of compensation credit means there are surplus tokens in the token bucket of the color marker and a positive value of the compensation credit means there is a shortage of tokens in the token bucket of the color marker. All the compensation credits are initialized as value zero. Whether a packet of tenant 'A' classified with priority i can be transmitted by the networking device 200 is depending on the color given by the primary color marker and the value of the compensation credit. The sum of the number of tokens and the compensation credit is the real number of tokens in a color marker because there are some situations in which the number of tokens in the token bucket of a color marker should be corrected. In a first example, a packet that is colored green by a subsidiary color marker indicates that a number of tokens, equal to the length of the packet, have been taken away from the token bucket of the subsidiary color marker. However, if the packet is finally discarded, those tokens are deemed to have been erroneously taken away from the subsidiary color marker. In a second example, a packet that is colored red by a subsidiary color marker indicates that no token has been taken away from the token bucket of the subsidiary color marker. However, if the packet is finally transmitted, those token are deemed to have been reserved in error. Thus the value of the compensation credit is configured to correct the number of tokens of the color marker.

Figure 4:
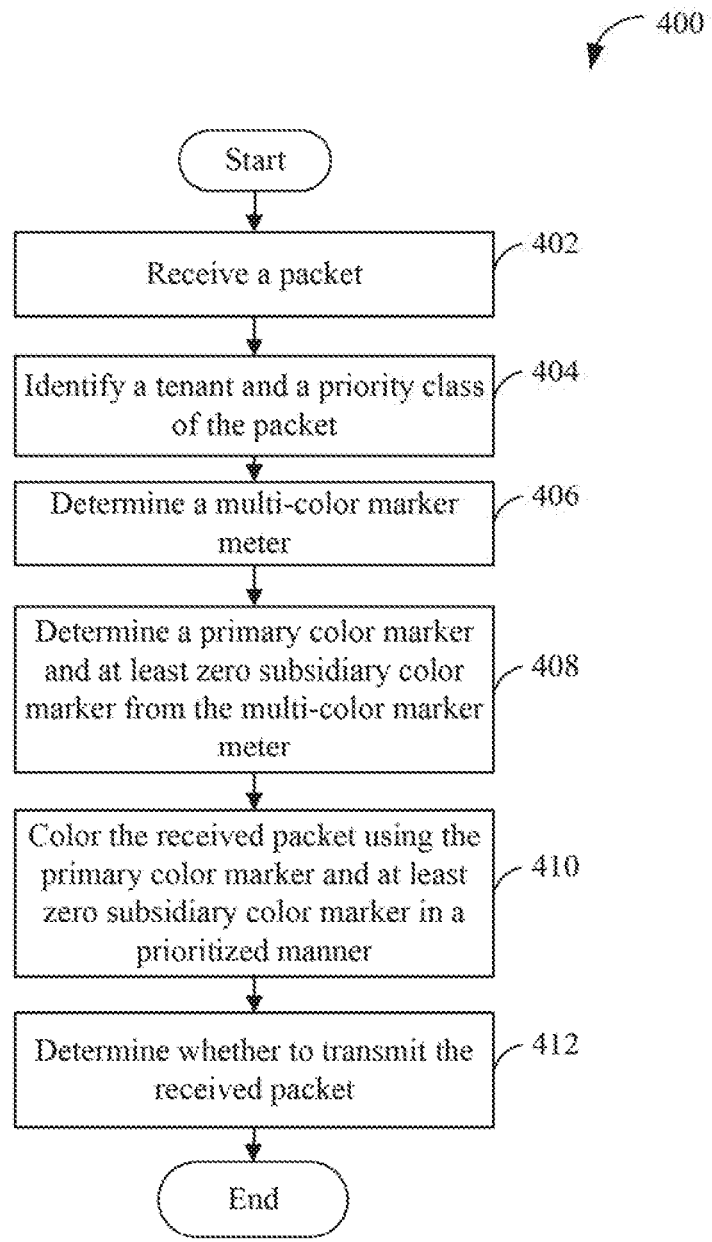
FIG. 4 is a flow chart of one embodiment of a method for providing QoS differentiation applied by the networking device of FIG. 2.

FIG. 4 illustrates a flowchart of a method 400 for providing QoS differentiation for each tenant using the plurality of multi-color marker meters, executed by the networking device 200, according to an embodiment.

At block 402, a packet is received at the networking device 200. The packet may be part of a particular packet flow of one tenant.

At block 404, the networking device 200 identifies a tenant and a priority class associated with the received packet. In one embodiment, the networking device 200 may identify the tenant and the priority class associated with the received packet based on the VLAN information and the protocol port information.

At block 406, the networking device 200 determines a multi-color marker meter based on the identified tenant that associated with the received packet, wherein the multi-color marker meter comprises a plurality of the color markers, and each of the plurality of the color markers comprises a compensation credit.

At block 408, the networking device 200 determines a primary color marker and at least zero subsidiary color marker from the multi-color marker meter based on the identified priority.

At block 410, the networking device 200 colors the received packet using the primary color marker and at least zero subsidiary color marker in a prioritized manner.

At block 412, the networking device 200 determines whether to transmit the received packet based on the color given by the primary color marker and the value of the compensation credit of the primary color marker.

The detailed processing steps of determining whether to transmit the received packet and the updating of the value of the compensation credit for each of the plurality of color markers are described using the following four situations.

In the first situation, if a color given by the primary color marker is not red and the value of the compensation credit of the primary color marker is greater than zero after adding the packet length of the received packet, the networking device 200 determines to transmit the received packet. The value of the compensation credit of the primary color marker remains unchanged. For each subsidiary color marker, if a color given by the subsidiary color marker is red, the value of the compensation credit of the subsidiary color marker is reduced by the packet length of the received packet; otherwise, the value of the compensation credit of the subsidiary color marker remains unchanged.

In the second situation, if a color given by the primary color marker is red but the value of the compensation credit of the primary color marker is greater than or equal to the packet length of the received packet, the networking device 200 determines to transmit the received packet. The value of the compensation credit of the primary color marker is reduced by the packet length of the received packet. For each subsidiary color marker, if a color given by the subsidiary color marker is red, the value of the compensation credit of the subsidiary color marker is reduced by the packet length of the received packet; otherwise, the value of the compensation credit of the subsidiary color marker remains unchanged.

In the third situation, if a color given by the primary color marker is not red but the value of the compensation credit of the primary color marker is less than or equal to zero after adding the packet length of the received packet, the networking device 200 determines to discard the received packet. The value of the compensation credit of the primary color marker is increased by the packet length of the received packet. For each subsidiary color marker, if a color given by the subsidiary color marker is red, the value of the compensation credit of the subsidiary color marker remains unchanged; otherwise, the value of the compensation credit of the subsidiary color marker is increased by the packet length of the received packet.

In the fourth situation, if a color given by the primary color marker is red and the value of the compensation credit of the primary color marker is less than the packet length of the received packet, the networking device 200 determines to discard the received packet. The value of the compensation credit of the primary color marker remains unchanged. For each subsidiary color marker, if a color given by the subsidiary color marker is red, the value of the compensation credit of the subsidiary color marker remains unchanged; otherwise, the value of the compensation credit of the subsidiary color marker is increased by the packet length of the received packet.

In another embodiment, if the number of tokens of the plurality of the color markers can be updated dynamically, the networking device 200 determines whether to transmit the received packet only based on the color given by the primary color marker at step 412. If a color given by the primary color marker is red, the networking devices 200 determines to discard the received packet; otherwise, the networking devices 200 determines to transmit the received packet. For each of the subsidiary color markers, if a color given by the subsidiary color marker is red and the received packet is finally transmitted, the number of tokens of the subsidiary color marker is reduced by the packet length of the received packet; otherwise, if a color given by the subsidiary color marker is not red but the received packet is finally discarded, the number of tokens of the subsidiary color marker is increased by the packet length of the received packet length.

The present disclosure enables the networking device in the multi-tenant network 100 to provide priority differentiation and bandwidth guaranteed for multiple tenants. A tenant is free from the interference of the traffic generation and bandwidth usage of the other tenants in the multi-tenant network. Specifically, the bandwidth usage of a tenant can be guaranteed and follows the strict priority classes for the tenant.

The embodiments shown and described above are only examples. Many details are often found in the art such as the other features of a networking device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for providing quality of service (QoS) in a multi-tenant network applicable in a networking device, the method comprising:
   receiving a packet;
   identifying a tenant and a priority class associated with the received packet;
   determining a multi-color marker meter based on the identified tenant, wherein the multi-color marker meter comprises a plurality of color markers, and each of the plurality of color markers comprises a compensation credit;
   determining a primary color marker and at least zero subsidiary color marker from the multi-color marker meter based on the identified priority;
   coloring the received packet using the primary color marker and at least zero subsidiary color marker in a prioritized manner; and
   determining whether to transmit the received packet based on a coloring given by the primary color marker and a value of the compensation credit of the primary color marker.

2. The method of claim 1, wherein the number of the plurality of color markers is equal to a number of priority classes of the identified tenant.

3. The method of claim 1, wherein each of the plurality of color markers comprises a rate limitation which is configured as a guaranteed bandwidth of the identified tenant.

4. The method of claim 3, wherein the primary marker colors the received packet red when the received packet is not compliance with the rate limitation.

5. The method of claim 4, wherein the determining whether to transmit the received packet based on a color given by the primary color marker and a value of the compensation credit of the primary color marker step further comprises: determining to transmit the received packet if the color given by the primary color marker is not red and the value of the compensation credit of the primary color marker is greater than zero after adding a packet length of the received packet; and updating a value of a compensation credit of each of the subsidiary color marker if a color given by the subsidiary color marker is red.

6. The method of claim 5, wherein the determining whether to transmit the received packet based on a color given by the primary color marker and a value of the compensation credit of the primary color marker step further comprises: determining to transmit the received packet if the color given by the primary color marker is red and the value of the compensation credit of the primary color marker is greater than or equal to the packet length of the received packet; updating the value of the compensation credit of the primary color marker; and updating the value of the compensation credit of each of the subsidiary color marker if a color given by the subsidiary color marker is red.

7. The method of claim 6, wherein the determining whether to transmit the received packet based on a color given by the primary color marker and a value of the compensation credit of the primary color marker step further comprises: determining to discard the received packet if the color given by the primary color marker is not red and the value of the compensation credit of the primary color marker is less than or equal to zero by adding the packet length of the received packet; updating the value of the compensation credit of the primary color marker; and updating the value of the compensation credit of each of the subsidiary color marker if a color given by the subsidiary color marker is not red.

8. The method of claim 7, wherein the determining whether to transmit the received packet based on a color given by the primary color marker and a value of the compensation credit of the primary color marker step further comprises: determining to discard the received packet if the color given by the primary color marker is red and the value of the compensation credit of the primary color marker is less than the packet length of the received packet; and updating the value of the compensation credit of each of the subsidiary color marker if a color given by the subsidiary color marker is not red.

9. A networking device in a multi-tenant network, the networking device comprising:
a processor; and
a memory for storing at least one computer program, wherein the computer program comprises instructions which are executed by the processor, and performs the following steps:
receiving a packet;
identifying a tenant and a priority class associated with the received packet;
determining a multi-color marker meter based on the identified tenant, wherein the multi-color marker meter comprises a plurality of color markers, and each of the plurality of color markers comprises a compensation credit;
determining a primary color marker and at least zero subsidiary color marker from the multi-color marker meter based on the identified priority;
coloring the received packet using the primary color marker and at least zero subsidiary color marker in a prioritized manner; and
determining whether to transmit the received packet based on a color given by the primary color marker and a value of the compensation credit of the primary color marker.

10. The networking device of claim 9, wherein the number of the plurality of color markers is equal to a number of priority classes of the identified tenant.

11. The networking device of claim 9, wherein each of the plurality of color markers comprises a rate limitation which is configured as a guaranteed bandwidth of the identified tenant.

12. The networking device of claim 11, wherein the primary marker colors the received packet red when the received packet is not compliance with the rate limitation.

13. The networking device of claim 12, wherein the determining whether to transmit the received packet based on a color given by the primary color marker and a value of the compensation credit of the primary color marker step further comprises: determining to transmit the received packet if the color given by the primary color marker is not red and the value of the compensation credit of the primary color marker is greater than zero after adding a packet length of the received packet; and updating a value of a compensation credit of each of the subsidiary color marker if a color given by the subsidiary color marker is red.

14. The networking device of claim 13, wherein the determining whether to transmit the received packet based on a color given by the primary color marker and a value of the compensation credit of the primary color marker step further comprises: determining to transmit the received packet if the color given by the primary color marker is red and the value of the compensation credit of the primary color marker is greater than or equal to the packet length of the received packet; updating the value of the compensation credit of the primary color marker; and updating the value of the compensation credit of each of the subsidiary color marker if a color given by the subsidiary color marker is red.

15. The networking device of claim 14, wherein the determining whether to transmit the received packet based on a color given by the primary color marker and a value of the compensation credit of the primary color marker step further comprises: determining to discard the received packet if the color given by the primary color marker is not red and the value of the compensation credit of the primary color marker is less than or equal to zero by adding the packet length of the received packet; updating the value of the compensation credit of the primary color marker; and updating the value of the compensation credit of each of the subsidiary color marker if a color given by the subsidiary color marker is not red.

16. The networking device of claim 15, wherein the determining whether to transmit the received packet based on a color given by the primary color marker and a value of the compensation credit of the primary color marker step further comprises: determining to discard the received packet if the color given by the primary color marker is red and the value of the compensation credit of the primary color marker is less than the packet length of the received packet; and updating the value of the compensation credit of each of the subsidiary color marker if a color given by the subsidiary color marker is not red.

* * * * *